US012540814B2

(12) United States Patent
Huang et al.

(10) Patent No.: US 12,540,814 B2
(45) Date of Patent: Feb. 3, 2026

(54) HIGH TEMPERATURE MOLD GAP MEASUREMENT USING OPTICAL FIBER INTERFEROMETRY

(71) Applicant: The Curators of the University of Missouri, Columbia, MO (US)

(72) Inventors: Jie Huang, Rolla, MO (US); Ronald O'Malley, Rolla, MO (US); Dinesh Reddy Alla, Rolla, MO (US); Deva Prasaad Neelakandan, Rolla, MO (US); Muhammad Roman, Rolla, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 102 days.

(21) Appl. No.: 18/706,149

(22) PCT Filed: Nov. 1, 2022

(86) PCT No.: PCT/US2022/048571

§ 371 (c)(1),
(2) Date: Apr. 30, 2024

(87) PCT Pub. No.: WO2023/081151

PCT Pub. Date: May 11, 2023

(65) Prior Publication Data

US 2025/0003735 A1    Jan. 2, 2025

Related U.S. Application Data

(60) Provisional application No. 63/263,420, filed on Nov. 2, 2021.

(51) Int. Cl.
*G01B 11/14*    (2006.01)
*G01B 11/06*    (2006.01)
*G01K 11/32*    (2021.01)

(52) U.S. Cl.
CPC .......... *G01B 11/14* (2013.01); *G01B 11/0625* (2013.01); *G01K 11/32* (2013.01); *G01B 2290/25* (2013.01)

(58) Field of Classification Search
CPC .......... G01M 11/0271; G01M 11/0242; G06F 30/17; G01B 9/02047; G01B 9/0209
See application file for complete search history.

(56) References Cited

U.S. PATENT DOCUMENTS

| 5,543,105 A | 8/1996 | Stummer et al. |
| 2005/0257392 A1 | 11/2005 | Wood et al. |

(Continued)

FOREIGN PATENT DOCUMENTS

JP    06294685 A  * 10/1994

OTHER PUBLICATIONS

Balogun et al., "A Fiber Optic Distributed Temperature Mapping Technique to Characterize Shell Solidification in Peritectic Grade Steels", AISTech 2021, Nashville, Jun. 2021.

(Continued)

*Primary Examiner* — Hwa Andrew Lee
(74) *Attorney, Agent, or Firm* — Stinson LLP

(57) ABSTRACT

A temperature insensitive fiber optic Fabry-Perot interferometer based mold gap measurement system that can be employed in foundry and continuous casting facilities for both non-ferrous and ferrous production applications. For steel continuous casting, the sensor is also capable of detecting crystallite formation in the mold flux layer within the mold gap by detecting reflections from both the flux layer and the steel shell to facilitate direct mold lubrication monitoring for continuous casting. These interferometers can also be easily multiplexed to perform interface shape measurements or monitor gap variations at various positions within a complex mold design. The ability to measure the (Continued)

cast shape exiting a continuous casting mold during operation will provide a new tool to monitor and improve product quality during operation and enhance the safety of the process through the detection of conditions that lead to slab cracking and breakouts.

20 Claims, 4 Drawing Sheets

(56)  References Cited

U.S. PATENT DOCUMENTS

| | | | |
|---|---|---|---|
| 2006/0238775 A1 | 10/2006 | Lopushansky et al. | |
| 2010/0111136 A1* | 5/2010 | Huang | G01N 21/7703 374/161 |
| 2011/0167905 A1 | 7/2011 | Arzberger et al. | |
| 2016/0061689 A1* | 3/2016 | Morley | B29D 11/00038 356/496 |

OTHER PUBLICATIONS

International Search Report and Written Opinion from PCT Application No. PCT/US2022/048571, dated Jan. 31, 2023, 9 pages.
Roman et al., "Distributed Fiber-Optic Sensing with Low Bending Loss Based on Thin-Core Fiber", IEEE Sensors Journal, IEEE, vol. 21, No. 6, Mar. 2021, pp. 7672-7680, ISSN: 1530-437X.
Roman et al., "A Spatially Distributed Fiber-Optic Temperature Sensor for Applications in the Steel Industry", Sensors 2020, 3900.
Roman et al., "Peritectic Behavior Detection in the Fe—C—Mn—Al—Si Steel System using Fiber Optic Temperature Mapping", Proc. AISTech 2020.
O'Malley et al. "Influence of Mold Flux Crystallite Film Fracture on Thermal Fluctuations in a Thin Slab Funnel Mold", Iron & Steel Technology, AIST, Jul. 2018, pp. 58-66.
Peterson et al., "Investigation of Mold Flux Crystallization by Rapid Quenching and Isothermal Aging in Molten Tin", Proc., AISTech 2017, Nashville, TN, May 2017.
Nolte et al. "Application of Cathodoluminescence in Analyzing Mold Flux Films", Proceedings of the 10th International Conference on Molten Slags, Fluxes and Salts 2016, Seattle, Washington, May 2016, pp. 317-325.
Hibbeler et al., "A Reduced-Order Model of Mould Heat Transfer in the Continuous Casting of Steel:", Applied Mathematical Modeling, vol. 40 (19), May 2016, pp. 8530-8551.
Hibbeler et al., "Calibration of Thermal Models of Steel Continuous Casting Molds", AIST Transactions, Sep. 2013, pp. 199-210.
Zhao et al., "Transient Flow and Temperature Transport in Continuous Casting of Steel Slabs", Met and Mat Trans B, vol. 36, (6) Dec. 2005, p. 801-823. (Abstract Only).
OMalley et al., "409 Casting Trials with Parabolic Mold Taper at AK Steel's Mansfield Operations Using VAI's DIAFACE® Mold Technology" CCC 2000—Proceedings of the 8th Continuous Casting Conference, Linz, Austria, paper 9, Jun. 5-7, 2000.
O'Malley et al., "Observations of Various Steady State and Dynamic Thermal Behaviors in a Continuous Casting Mold", Proc. 82nd Steelmaking Conf., ISS, Chicago, IL, Mar. 21-24, 1999.
Thomas et al., "Measurement of Temperature, Solidification, and Microstructure in a Continuous Cast Thin Slab", Proc. Modeling of Casting, Welding & Advanced Solidification Processes III, Minerals, Metals & Materials Society, San Diego, CA, Jun. 7-12, 1998, pp. 849-860.
Zhao et al.,|Transient flow and temperature transport in continuous casting of steel slabs.|Metallurgical and Materials Transactions, Dec. 2005, 36B, 6, Technology Collection, 23 pages.

\* cited by examiner

HIGH TEMPERATURE MOLD GAP MEASUREMENT USING OPTICAL FIBER INTERFEROMETRY

CROSS-REFERENCE TO RELATED APPLICATIONS

This application is a U.S. national stage application of International Application No. PCT/US2022/048571, filed Nov. 1, 2022, and claims the benefit of U.S. Patent Application No. 63/263,420, filed Nov. 2, 2021, the entire contents of which are incorporated by reference in their entirety for all purposes.

BACKGROUND

Solidification is a fundamental step in all metals manufacturing processes, and the vast majority of these processes employ some type of mold to convert liquid metal into a desired solid shape. Much remains unknown about the fundamental nature of the heat transfer at the mold-metal interface, particularly for complex shape castings and continuously cast metals. Mathematical models that couple solidification, heat transfer, and mechanical stress have been employed to gain insight into the behavior of the gap that develops at the interface during solidification in static molds. More sophisticated models have also included mold flux liquid and crystalline layers in the gap models in an attempt to model and predict the solidification and heat transfer behavior in the continuous caster mold from first principles.

A fundamental capability that has been lacking in this area is the ability to directly measure the mold gap and temperature profile as it develops during the high temperature solidification process. Attempts to measure the developing mold gap during solidification use a linear displacement sensor, such as a linear variable differential transformer (LVDT) have met with only limited success. Such displacement sensors are mechanically complex to mount and require temperature compensation.

SUMMARY

Aspects of the present disclosure permit accurate mold gap measurements using optical fiber interferometry. An optical interferometer approach performs dynamic measurements of the mold gap at elevated temperatures during casting. The ability to predict, and ultimately control, local solidification conditions at the mold-metal interface has a significant overall impact on cast product quality and yield, and greatly enhances the metal industry's ability to produce new more difficult-to-cast alloys and products for both military and industrial markets.

Sensor technology embodying aspects of the present disclosure can directly impact the quality and yield of production ferrous and non-ferrous castings and products produced by the continuous casting route, such as sheet, plate and SBQ bar products, resulting in a higher quality and lower cost supply chain.

In an aspect, a temperature-insensitive fiber optic Fabry-Perot interferometer-based mold gap measurement system can be employed in foundry and continuous casting facilities for both non-ferrous and ferrous production applications. For steel continuous casting, the sensor is also capable of detecting crystallite formation in the mold flux layer within the mold gap by detecting reflections from both the flux layer and the steel shell to facilitate direct mold lubrication monitoring for continuous casting. These interferometers can also be easily multiplexed to perform interface shape measurements or monitor gap variations at various positions within a complex mold design. The ability to measure the cast shape exiting a continuous casting mold during operation will provide a new tool to monitor and improve product quality during operation and enhance the safety of the process through the detection of conditions that lead to slab cracking and breakouts.

In another aspect, an optical fiber interferometer sensor system for measuring a metal-mold gap comprises a ferrule embedded in a wall of a mold with a first end of the ferrule flush with an interior surface of the mold. An optical fiber has at least an end margin positioned within the ferrule such that an end face of the optical fiber is recessed from the first end of the ferrule and the interior surface of the mold by a predetermined distance. The optical fiber is configured to transmit light and to receive light reflected from a metal deposited in the mold. The sensor system also includes an interferometer coupled to the optical fiber. The interferometer is configured to measure a distance between the end face of the optical fiber and the metal deposited in the mold as a function of the reflected light from within the mold received by the optical fiber.

In yet another aspect, a method of measuring a metal-mold gap comprises positioning an optical fiber such that an end face of the optical fiber is recessed from an interior surface of the mold by a predetermined distance. The optical fiber is configured to transmit light and to receive light reflected from the metal deposited in the mold. The method also includes transmitting, by an interferometer system, light through the optical fiber into an interior of the mold and receiving, by the interferometer system, light reflected within the optical fiber from the end face thereof and light reflected into the optical fiber from the metal in the mold. The method further comprises performing, by the interferometer system, Fabry-Pérot interferometry to measure a distance between the end face of the optical fiber and the metal deposited in the mold as a function of the received reflected light.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
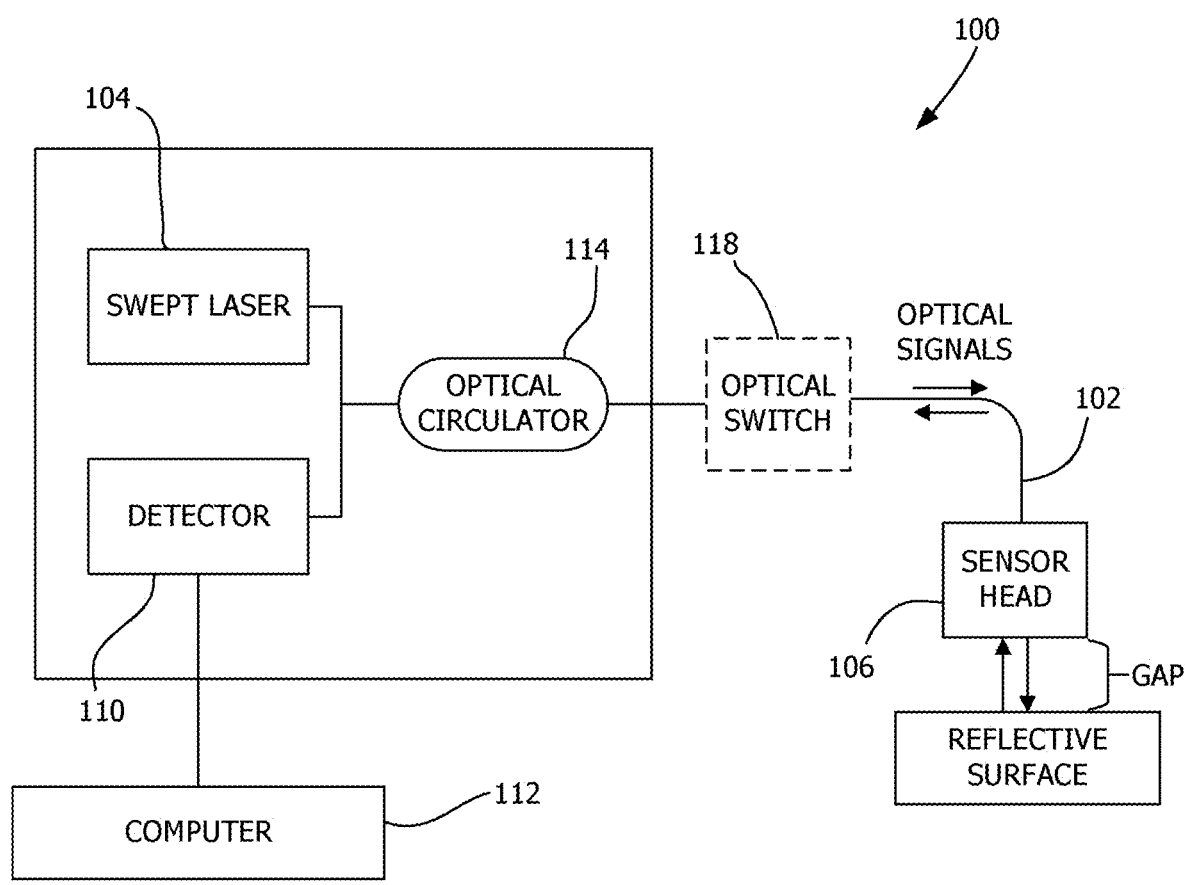
FIG. 1 illustrates a Fabry-Pérot Interferometer sensor according to an embodiment.

Aspects of the present disclosure relate to deploying a fiber optic interferometer-based mold gap measurement system that can be employed in foundry and continuous casting facilities for both non-ferrous and ferrous production applications. Referring to FIG. 1, a sensor 100 according to an embodiment comprises at least one optical fiber 102 fed by a swept laser 104. The light exits the optical fiber 102 at a sensor head 106. A detector 110 detects light reflected back through optical fiber 102 for processing by a processor, or computer, 112. In the illustrated embodiment, an optical circulator 114 ensures any reflected light does not travel back to the laser 104. If the sensor 100 includes a plurality of optical fibers 102, an optical switch 118 may be used to switch which of the optical fibers carry the optical signals. In this manner, sensor 100 forms an extrinsic Fabry-Pérot interferometer (FPI).

Figure 2:
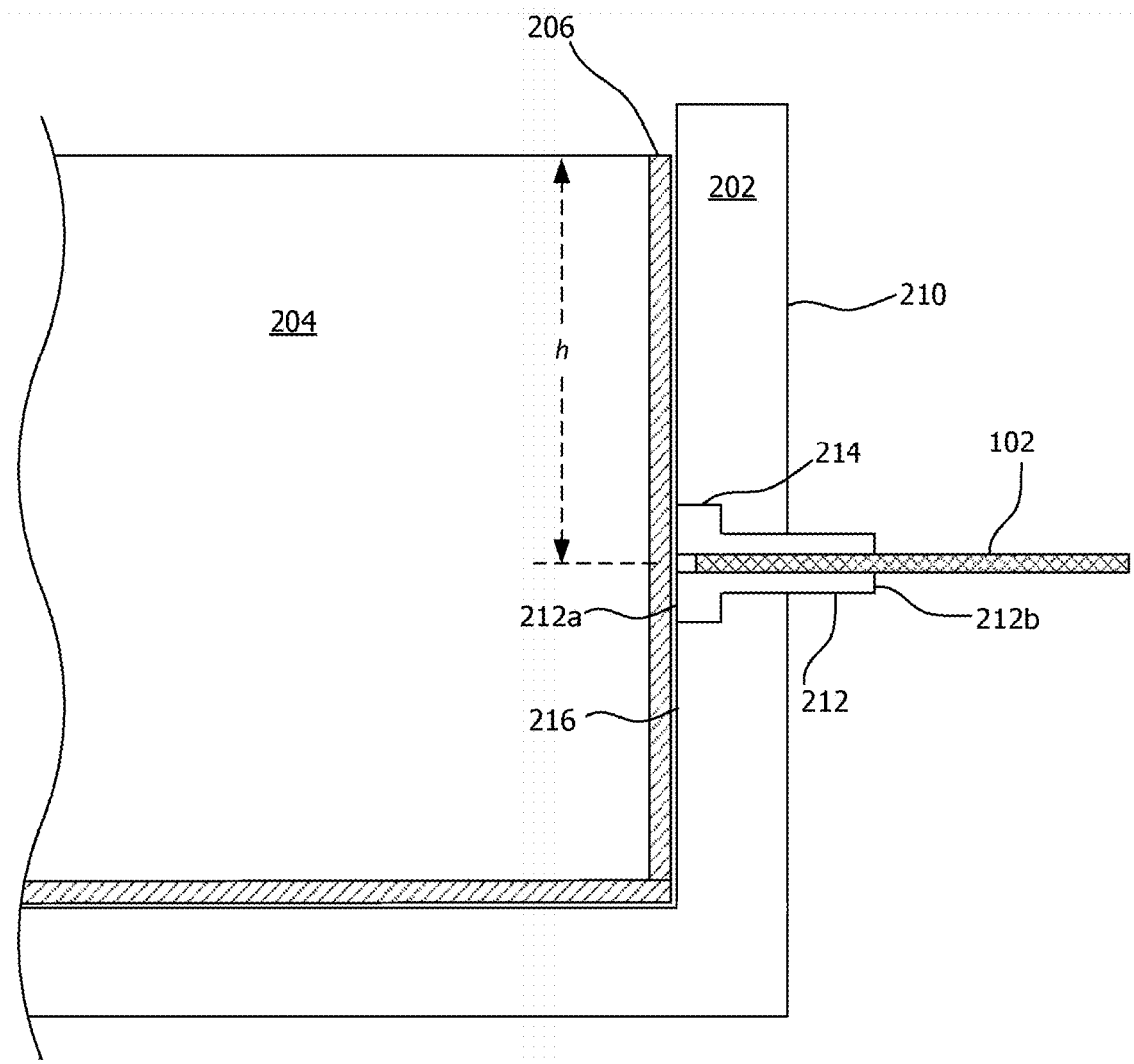
FIG. 2 is an example of the sensor of FIG. 1 used for gap detection in a metal mold according to an embodiment.

FIG. 2 is a cross-sectional view of an example mold 202 containing a metal 204. As shown, a solidified shell 206 of the metal 204 develops during the solidification process. As shown, the mold 202 has a wall 210 in which optical fiber 102 of the FPI sensor 100 is embedded. The wall 210 includes an opening shaped and sized to receive a ferrule 212 (i.e., sensor head 106). In an embodiment, the ferrule 212 comprises a retainer 214 for securing ferrule 212 in position within wall 210. The ferrule 212 has an orifice shaped and sized to receive optical fiber 102. The ferrule has a distal end 212a flush with an interior surface 216 of the wall 210 and a proximal end 212b from which optical fiber 102 extends and connects to the laser 104 and to the detector 110. In an embodiment, the distal end 212a is configured to have a larger diameter than the proximal end 212b. Further, the distal end 212a of ferrule 212 has an interior face configured to face the interior of the mold 202. The ferrule 212 is embedded into the opening of the wall 210 such that the interior face of the ferrule 212 at the distal end 212a sits flush with the interior surface 216 of the wall 210. According to aspects of the present disclosure, the optical fiber-based sensor 100 uses the principle of Fabry-Pérot interferometry for directly measuring a gap between the mold 202 and metal 204.

Figure 3:
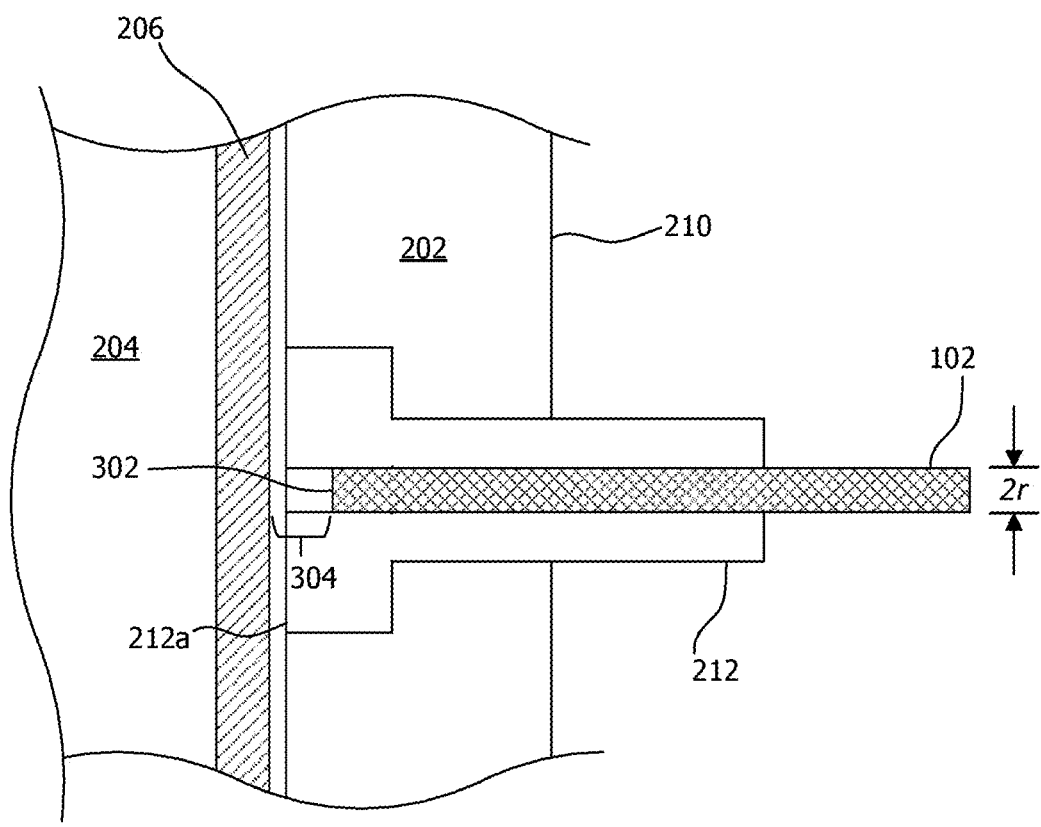
FIG. 3 is an enlarged view of the mold according to the embodiment of FIG. 2.

FIG. 3 is an enlarged view of the interface between optical fiber 102 and the shell 206. As shown in FIG. 3, an end face 302 of the optical fiber 102, when inserted into ferrule 212, does not sit flush with the distal end 212a of ferrule 212 and the interior surface of wall 210. Instead, optical fiber 102 is set back or recessed from the interior surface of wall 210 by a predetermined distance when ferrule 212 is installed. By recessing the optical fiber 102, a gap 304 formed between the end face 302 and the metal 204 (or the shell 206 of metal 204) can be measured. The size of the orifice through ferrule 212 is configured such that surface tension of the molten metal 204, when poured into mold 202, does not permit the molten metal to penetrate the orifice or otherwise fill the recess. In this manner, the gap 304 between optical fiber 102 and the interior surface 216 of wall 210 is maintained through the casting process and light emitted by optical fiber 102 is incident upon metal 204 and reflected back to permit measurement of the gap 304. Because the distance by which fiber 102 is recessed from the end face of distal end 212a is known, any gap between shell 206 and the interior surface 216 of wall 210 can be determined.

In the illustrated embodiment, the orifice has a diameter of 2r, where r is defined as shown in equation (1), below:

$$r < \frac{-2\gamma \cos \theta}{\rho g h} \quad (1)$$

Wherein $\gamma$ is surface tension, $\theta$ is the contact angle, $\rho$ is density, g is the acceleration of gravity, and h is the height of the liquid metal 204 that is above the orifice.

Referring further to FIGS. 1-3, the working principle of the optical fiber Fabry-Pérot interferometer (FPI) sensor 100 is shown. The optical fiber 102 is employed to directly measure the gap 304 that develops during the solidification process between mold 202 and metal 204 using the principle of Fabry-Pérot interferometry. Fabry-Pérot interferometry is used to measure the distance between two parallel reflecting surfaces. The benefit of this sensor technology is that it is insensitive to temperature variations in the gap 304, easy to mount and immune to electromagnetic interference.

The end face 302 of the optical fiber and a reflector (i.e., metal 204) form an extrinsic Fabry-Pérot interferometer having a cavity length of L (i.e., gap 304). The interference signal (I) is given by equation (2), below:

$$I = I_1 + I_2 + 2\sqrt{I_1 I_2} \cos\left(\frac{4\pi n L}{\lambda} + \varphi\right) \quad (2)$$

$I_1$ and $I_2$ are the light intensities reflected from the end face 302 of the optical fiber 102 and the reflector, respectively; $\varphi$ is the initial phase difference of the interferometer sensor 100; n is the refractive index of air (which is approximately 1), and L is the air cavity length (i.e., gap 304). The space between two successive minima of the spectrum, defined as the free spectral range (FSR), can be expressed as in equation (3), below:

$$FSR = \frac{\lambda^2}{2L} \quad (3)$$

where $\lambda$ is the wavelength of the propagated light. So, the cavity length can be demodulated by determining the FSR of the interference spectrum. The change in cavity length $\Delta L$ can be determined by equation (4), below:

$$\Delta L = \frac{\lambda^2 \Delta FSR}{FSR_1 FSR_2} \quad (4)$$

$FSR_1$, $FSR_2$ are the values of FSR before and after displacement.

In use, the optical fiber 102 is installed into the ferrule 212 and the ferrule is installed in the wall 210 of the mold 202. At an initial time, a reflective surface can be abutted against the interior surface of the wall 210 over the optical fiber 102. The laser 104 emits light through the optical fiber 102, which is set back in the ferrule 212. The light is reflected off of the reflective surface and transmitted back through optical fiber 102 to the detector 110. The computer 112 processes the reflected light and calculates the distance between the end face 302 of optical fiber 102 and the reflective surface. This distance is the baseline calibration distance between the optical fiber 102 and the interior face of the wall 210. When the molten metal 204 is poured into mold 202, the solidified shell 206 begins to form against the interior surface of wall 210 of the mold 202. The solidified shell 206 is formed due to the temperature differential between the mold 202 and the molten metal 204, thus forming the initial layer of solidified metal 204. During the pour, the laser 104 emits light through the optical fiber 102 and the solidified shell 206 acts as the reflector of the optical fiber FPI sensor 100. The light is reflected off of the solidified shell 206 and transmitted back through the optical fiber 102 to the detector 110. The computer 112 processes the reflected light and calculates the distance between the optical fiber 102 and the solidified shell 206. When the solidified shell 206 is first formed, the distance measured between the solidified shell 206 and the optical fiber is equal to the calibration distance, as no shrinkage has occurred in the metal 204. However, as the metal 204 continues to solidify, the metal begins to shrink and gap 304 increases, including a portion forming between the interior surface 216 of the mold 202 and the solidified shell 206. As this gap 304 forms, the light emitted from the optical fiber 102 is used to measure a distance that is larger than the calibration distance. Using the optical fiber FPI sensor 100, the differences in the distance between the optical fiber 102 and the metal 204 are measured over the span of the molding process.

Figure 4:
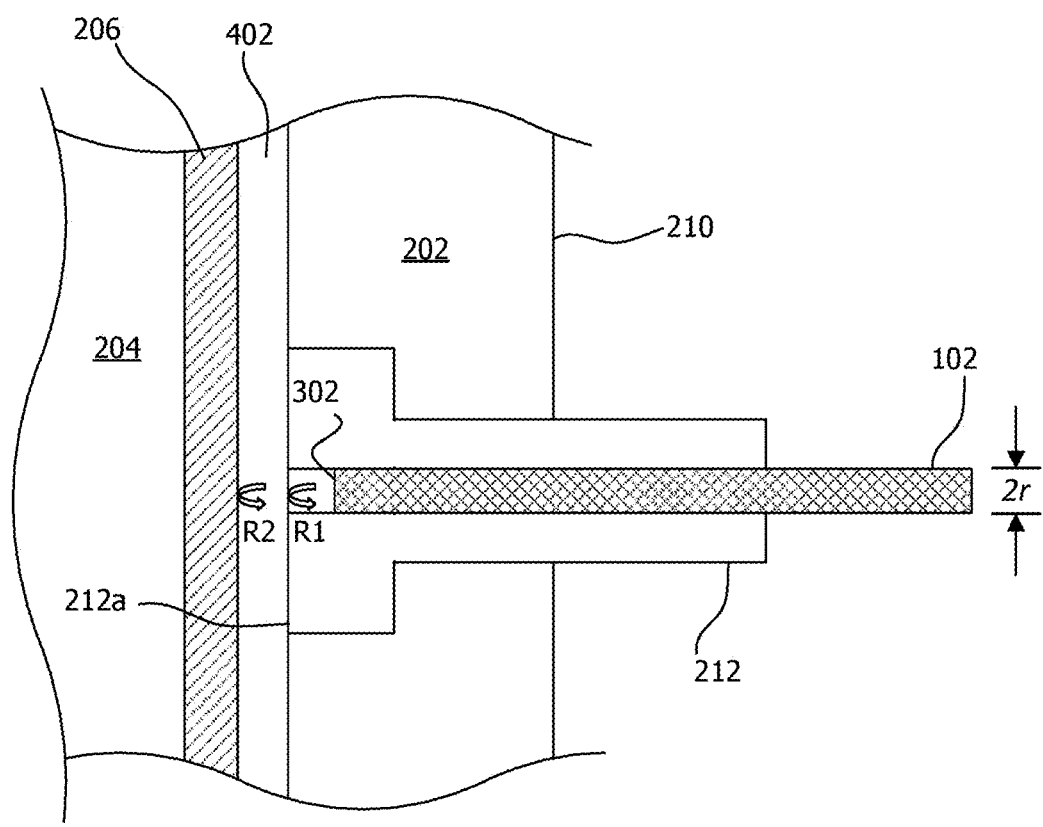
FIG. 4 is an enlarged view of a metal mold according to an alternative embodiment.

Referring to FIG. 4, an alternative embodiment of the current disclosure is shown. In this embodiment, the optical fiber FPI sensor 100 is implemented in a continuous casting mold 202. The optical fiber 102 is embedded in the mold 202, and a flux film 402 separates the optical fiber from the metal 204. The flux material is configured to allow the metal 204 to flow through the mold 202. As described above, Fabry-Pérot interferometry is used to measure the distance between two parallel reflecting surfaces. For steel continuous casting, the sensor 100 is capable of detecting crystallite formation in the mold flux layer within the mold gap 304 by detecting reflections from both the flux film 402 and the shell 206 to facilitate direct mold lubrication monitoring for continuous casting. These interferometers can also be easily multiplexed to perform interface shape measurements or monitor gap variations at various positions within a complex mold design. The ability to measure the cast shape exiting a continuous casting mold during operation provides a tool to monitor and improve product quality during operation and enhance the safety of the process through the detection of conditions that lead to slab cracking and breakouts. The optical fiber FPI 100 detects the crystallite formation in flux film 402 within gap 304 by detecting reflections from both the flux film 402 (indicated as R1) and the metal shell 206 (indicated as R2) to facilitate direct mold lubrication monitoring for continuous casting. Further, the optical fiber FPI 100 is configured to measure the thickness of the flux film 402, as the light can penetrate the flux film.

In another embodiment, sensor 100 includes a plurality of optical fibers 102 preferably arranged in a one-dimensional or two-dimensional array distributed on the interior surface 216 of the mold 202. The swept laser 104 feeds each of the optical fibers 102 and the detector 110 detects the light reflected back through each for processing by computer, 112. In this embodiment, the optical fiber FPI sensor 100 is implemented in an array to provide mold exit and temperature profile measurements.

In yet another embodiment, the optical fiber 102 is capable of emitting polarized light that is tunable to measure the reflective index as a function of the polarized light and to determine if a surface is isotropic.

Experimental data demonstrates the application of a Fabry-Pérot Interferometer sensor 100 for measuring gap 304 using a permanent mold casting with A356 aluminum. This experiment demonstrates that the solidified metal surface (i.e., the solidified shell 206) can serve as a reflector during the solidification process and track the mold gap 304 that develops as the casting shrinks and pulls away from the mold 202. This technology further permits gap and profile monitoring in the continuous casting of slabs and billets. For example, a common off-corner defect that can form in slabs and billets can be detected using the technology disclosed herein to avoid costly breakout events and quality downgrades. A Rayleigh Scattering-based fiber optic interrogation technique to measure temperature profiles along a fiber that passes through the gap 304 at sub-millimeter resolution and millisecond sampling rates is also disclosed herein. In combination with the interferometer sensor 100, the measurement systems provide new insights into mold-metal gap behavior for many types of foundry and continuous casting processes.

The sensor 100, in concert with other recent fiber optic sensor system advancements, provides improved knowledge of the heat transfer behavior at the mold-metal interface and enables significant improvements in cast product quality and yield for foundry and continuous cast producers in both the ferrous and non-ferrous manufacturing sector. The sensor 100 further provides the tools needed to assist in the development of new advanced high-strength alloy systems that often pose manufacturing challenges to existing metals manufacturers, thus enabling new developments for military and commercial applications. Finally, the application of sensor 100 for real-time monitoring of the casting process provides direct feedback regarding the state of the casting process, enabling real time control of the casting process.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in a simplified form that are further described in the Detailed Description. The Summary is not

What we claim is:

1. An optical fiber interferometer sensor system for measuring a metal-mold gap, the system comprising:
   a ferrule embedded in a wall of a mold, the ferrule having a first end flush with an interior surface of the mold;
   an optical fiber having at least an end margin positioned within the ferrule such that an end face of the optical fiber is recessed from the first end of the ferrule and the interior surface of the mold by a predetermined distance, the optical fiber configured to transmit light, and the optical fiber further configured to receive light reflected from a metal deposited in the mold; and
   an interferometer coupled to the optical fiber, the interferometer configured to measure a distance between the end face of the optical fiber and the metal deposited in the mold as a function of the reflected light from within the mold received by the optical fiber.

2. The optical fiber interferometer sensor system as set forth in claim 1, wherein the interferometer utilizes Fabry-Pérot interferometry.

3. The optical fiber interferometer sensor system as set forth in claim 1, wherein the ferrule comprises a retainer at a distal end thereof for retaining the ferrule in the wall of the mold.

4. The optical fiber interferometer sensor system as set forth in claim 1, wherein the optical fiber transmits a polarized light.

5. The optical fiber interferometer sensor system as set forth in claim 4, wherein the interferometer is configured to measure a reflective index of the metal in the mold as a function of the polarized light.

6. The optical fiber interferometer sensor system as set forth in claim 4, wherein the interferometer is configured to detect whether a surface of the metal in the mold is isotropic using the polarized light.

7. The optical fiber interferometer sensor system as set forth in claim 1, wherein a flux film is applied on the interior surface of the mold, the flux film configured to allow the metal to flow through the mold, and wherein the interferometer is configured to measure a thickness of the flux film as a function of the reflected light from within the mold received by the optical fiber.

8. The optical fiber interferometer sensor system as set forth in claim 1, wherein the interferometer is further configured to measure a temperature profile of the metal in the mold using Rayleigh scattering.

9. The optical fiber interferometer sensor system as set forth in claim 1, wherein the ferrule includes an orifice into which the optical fiber is positioned, and wherein the orifice is sized to be sufficiently small such that surface tension prevents the metal in the mold from entering the orifice.

10. The optical fiber interferometer sensor system as set forth in claim 1, wherein the interferometer is insensitive to temperature variations affecting the predetermined distance between the end face of the optical fiber and the first end of the ferrule and the interior surface of the mold.

11. The optical fiber interferometer sensor system as set forth in claim 1, wherein the interferometer is configured to be multiplexed to perform measurements at a plurality of positions on the interior surface of the mold.

12. A method of measuring a metal-mold gap in a mold having a metal deposited therein, the method comprising:
    positioning an optical fiber such that an end face of the optical fiber is recessed from an interior surface of the mold by a predetermined distance, the optical fiber configured to transmit light, and the optical fiber further configured to receive light reflected from the metal deposited in the mold;
    transmitting, by an interferometer system, light through the optical fiber into an interior of the mold;
    receiving, by the interferometer system, light reflected within the optical fiber from the end face thereof;
    receiving, by the interferometer system, light reflected into the optical fiber from the metal in the mold; and
    performing, by the interferometer system, Fabry-Pérot interferometry to measure a distance between the end face of the optical fiber and the metal deposited in the mold as a function of the received reflected light.

13. The method as set forth in claim 12, further comprising embedding a ferrule in a wall of the mold, wherein the ferrule has a first end flush with the interior surface of the mold, and wherein the optical fiber has at least an end margin positioned within the ferrule such that the end face of the optical fiber is recessed from the first end of the ferrule and the interior surface of the mold by the predetermined distance.

14. The method as set forth in claim 12, wherein transmitting light through the optical fiber comprises transmitting a polarized light.

15. The method as set forth in claim 14, further comprising measuring, by the interferometer system, a reflective index of the metal in the mold as a function of the polarized light.

16. The method as set forth in claim 14, further comprising detecting, by the interferometer system, detect whether a surface of the metal in the mold is isotropic using the polarized light.

17. The method as set forth in claim 12, wherein a flux film is applied on the interior surface of the mold, and further comprising performing, by the interferometer system, Fabry-Pérot interferometry to measure a thickness of the flux film as a function of the received reflected light.

18. The method as set forth in claim 12, further comprising performing, by the interferometer system, a Rayleigh scattering interrogation to measure a temperature profile along the optical fiber.

19. The method as set forth in claim 12, further comprising:
    positioning an array of optical fibers such that end faces of the optical fibers in the array are recessed from the interior surface of the mold by the predetermined distance;
    transmitting, by the interferometer system, light through each of the optical fibers into the interior of the mold;
    receiving, by the interferometer system, light reflected within each of the optical fibers from the end faces thereof;
    receiving, by the interferometer system, light reflected into the optical fiber from the metal in the mold;
    performing, by the interferometer system, Fabry-Pérot interferometry to measure distances between the end faces of the optical fibers and the metal deposited in the mold as a function of the received reflected light; and
    multiplexing the measured distances to generate a profile of the metal-mold gap.

20. The method as set forth in claim 12, further comprising:
    transmitting light through the optical fiber into the interior of the mold onto a reflective surface positioned flush with an interior surface of the mold;

receiving light reflected into the optical fiber from the reflective surface;

determining a distance from the end face of the optical fiber to the reflective surface as a function of the received reflected light; and calibrating the predetermined distance based on the determined distance from the end face of the optical fiber to the reflective surface.

\* \* \* \* \*